United States Patent
Nashimoto et al.

(10) Patent No.: US 8,630,538 B2
(45) Date of Patent: Jan. 14, 2014

(54) COMMUNICATION SYSTEM, COMMUNICATION DEVICE, AND COMMUNICATION METHOD

(75) Inventors: Makoto Nashimoto, Kawasaki (JP); Kenji Ota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 163 days.

(21) Appl. No.: 13/362,721

(22) Filed: Jan. 31, 2012

(65) Prior Publication Data

US 2012/0243879 A1 Sep. 27, 2012

(30) Foreign Application Priority Data

Mar. 25, 2011 (JP) ................................. 2011-067258

(51) Int. Cl.
*H04B 10/00* (2013.01)
(52) U.S. Cl.
CPC ..................................... *H04B 10/00* (2013.01)
USPC .................. 398/31; 398/33; 398/38; 398/85; 398/160
(58) Field of Classification Search
USPC ........ 398/30–33, 37, 38, 82, 83, 85, 140, 160
See application file for complete search history.

(56) References Cited

U.S. PATENT DOCUMENTS

| | | | | |
|---|---|---|---|---|
| 6,141,125 A | * | 10/2000 | Blair et al. | 398/32 |
| 8,098,988 B2 | * | 1/2012 | Nakazato et al. | 398/25 |
| 2006/0023996 A1 | * | 2/2006 | Nakagawa et al. | 385/24 |
| 2009/0190205 A1 | * | 7/2009 | Onaka et al. | 359/334 |
| 2012/0106970 A1 | * | 5/2012 | Boduch et al. | 398/83 |

FOREIGN PATENT DOCUMENTS

| | | |
|---|---|---|
| JP | 10-150433 A | 6/1998 |
| JP | 11-275007 A | 10/1999 |
| JP | 2009-152903 A | 7/2009 |

* cited by examiner

*Primary Examiner* — Dalzid Singh
(74) *Attorney, Agent, or Firm* — Fujitsu Patent Center

(57) ABSTRACT

A communication system includes a transmitter that combines and transmits a first signal light and a dummy light having a wavelength different from the first signal light; a first amplifier that amplifies a light transmitted by the transmitter to a constant power; a communication device that separates the dummy light from the light amplified by the first amplifier, has a variable transmittance and allows the separated dummy light to pass through, and combines and transmits the passed dummy light and a second signal light having a wavelength different from the dummy light; a second amplifier that amplifies a light transmitted by the communication device to a constant power; a receiver that receives the second signal light included in the light amplified by the second amplifier; and a controller that controls the transmittance.

14 Claims, 13 Drawing Sheets

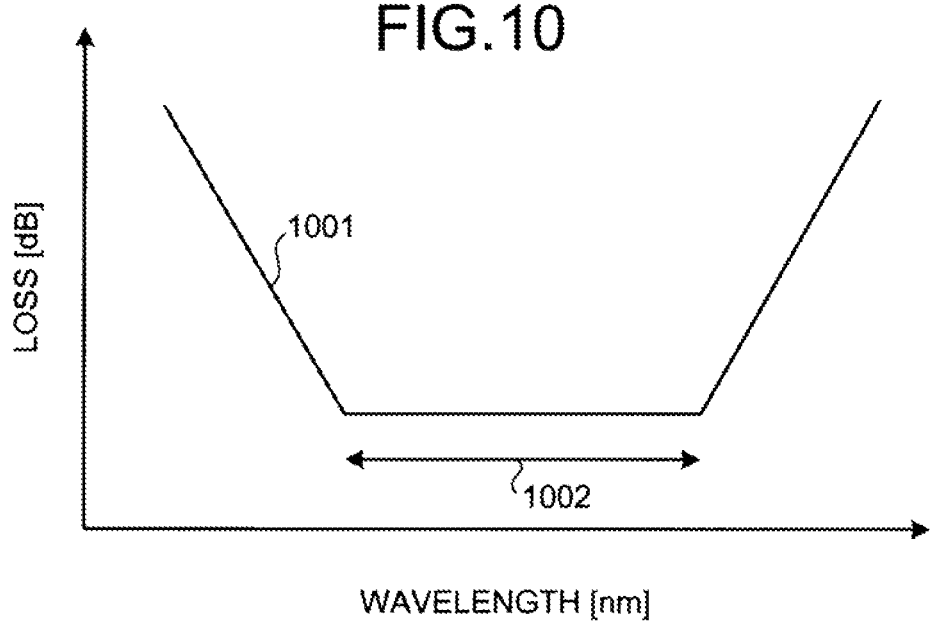
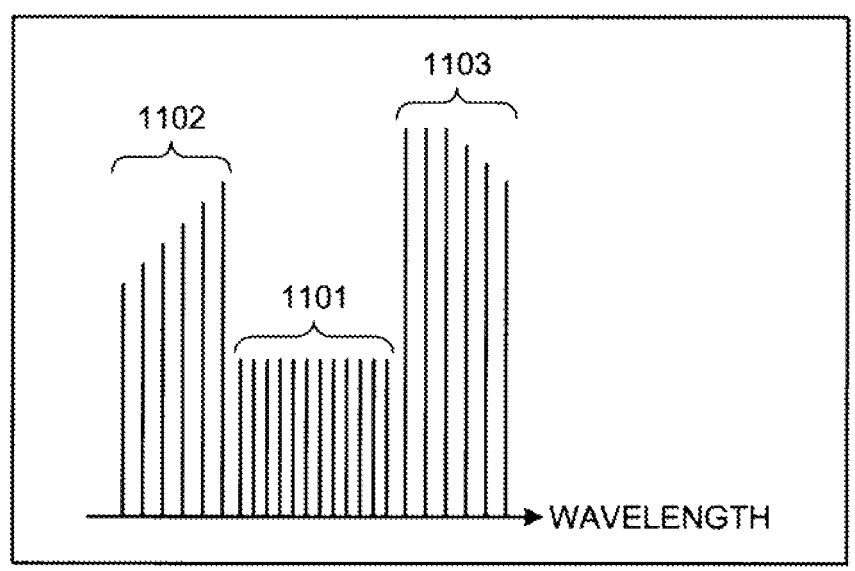

COMMUNICATION SYSTEM, COMMUNICATION DEVICE, AND COMMUNICATION METHOD

CROSS REFERENCE TO RELATED APPLICATIONS

This application is based upon and claims the benefit of priority of the prior Japanese Patent Application No. 2011-067258, filed on Mar. 25, 2011, the entire contents of which are incorporated herein by reference.

FIELD

The embodiments discussed herein are related to optical transmission.

BACKGROUND

In a conventional, long-haul wavelength division multiplexing (WDM) submarine transmission system, a submarine section including a submarine repeater is designed optimally such that required transmission characteristics are satisfied with the maximum number of wavelengths of the system. In general, however, the system comes into operation initially with a smaller number of wavelengths (for example, from several percent to about 10 percent) to optimize the initial construction costs.

In this case, the optical output from the submarine repeater is controlled to be constant assuming the maximum number of the wavelengths. Thus, if the initial number of the wavelengths is smaller than the maximum number, the power of each signal channel increases and the transmission quality deteriorates due to the nonlinear effect in the transmission path. A technology is known that combines and transmits dummy light (DL) in an unused band to prevent the deterioration and ensure transmission quality. The optimization of transmission characteristics for each signal is also demanded of a long-haul transmission, resulting in demand for technology that adjusts the level of signal light by adjusting the level of the dummy light.

In a long-haul transmission system, the cumulative effect of characteristics of fibers and/or submarine devices of multiple stages results in transmitted signals being affected by cumulative dispersion and/or the nonlinearity of the fibers. Thus, the waveform is significantly deteriorated, and the level of the transmitted signal on each line needs to be optimized. In particular, a system that includes an optical add drop multiplexer (OADM) requires a technique to optimize upstream and downstream trunk lines and, upstream and downstream branch lines separately, while minimizing the system costs and ensuring the security of the signal.

An OADM configured by combining a fiber grating and a circulator is conventionally known (see, for example, Japanese Laid-Open Patent Publication Nos. H10-150433 and H11-275007). In this configuration, the level of an add signal on a branch line is adjusted by inserting dummy light from a branch station when the add signal is combined to a signal on a trunk line.

However, it is difficult in the conventional technology to adjust the power of dummy light on a line that transmits signal light from a communication device, in which a complicated control mechanism and/or a light source (such as a submarine branching unit) is difficult to dispose, separately from the power of dummy light on the other lines. Thus, the power of the signal light amplified by a relay deviates from the appropriate range depending on the number of wavelengths of the signal light and the communication quality deteriorates.

For example, it is difficult to adjust the power of dummy light on a drop line from the submarine branching unit, separately from the power of dummy light on a trunk (through) line of and/or an add line to the submarine branching unit.

SUMMARY

According to an aspect of an embodiment, a communication system includes a transmitter that combines and transmits a first signal light and a dummy light having a wavelength different from the first signal light; a first amplifier that amplifies a light transmitted by the transmitter to a constant power; a communication device that separates the dummy light from the light amplified by the first amplifier, has a variable transmittance and allows the separated dummy light to pass through, and combines and transmits the passed dummy light and a second signal light having a wavelength different from the dummy light; a second amplifier that amplifies a light transmitted by the communication device to a constant power; a receiver that receives the second signal light included in the light amplified by the second amplifier; and a controller that controls the transmittance.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram of a first variation of the wavelength transmission characteristics of the optical filter.

FIG. 11 is a diagram of an example of WDM light on the downstream branch line corresponding to the first variation depicted in FIG. 10.

DESCRIPTION OF EMBODIMENTS

Preferred embodiments of the present invention will be explained with reference to the accompanying drawings.

Figure 1:
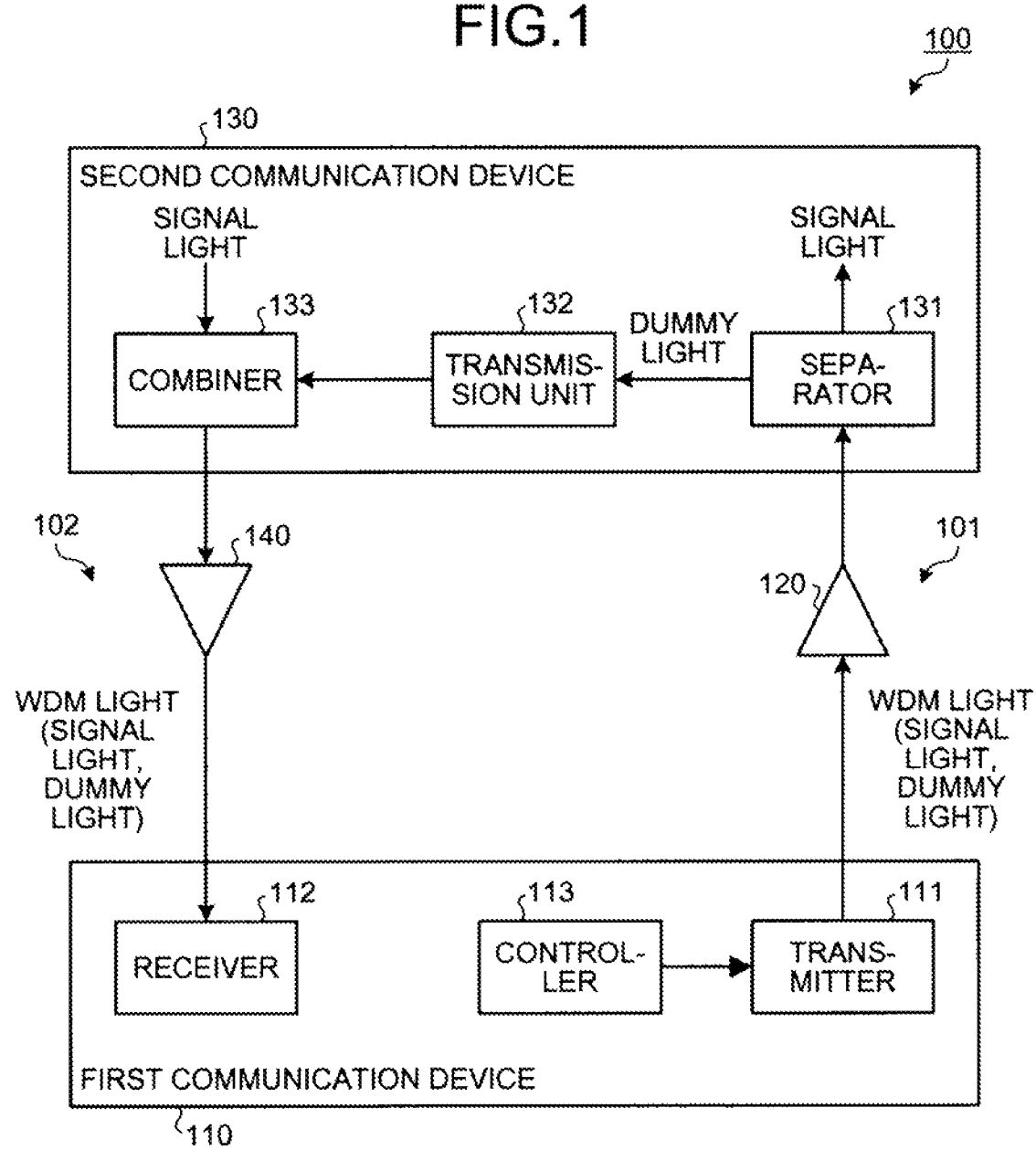
FIG. 1 is a diagram of an example of a configuration of a communication system according to an embodiment.

FIG. 1 is a diagram of an example of a configuration of a communication system according to an embodiment. As depicted in FIG. 1, a communication system 100 according to the embodiment includes a first communication device 110, a first amplifier 120, a second communication device 130, and a second amplifier 140. The first communication device 110 and the second communication device 130 mutually transmit/receive light through lines 101 and 102 on which the first amplifier 120 and the second amplifier 140 are provided, respectively.

The first communication device 110 includes a transmitter 111, a controller 113, and a receiver 112. The transmitter 111 transmits to the first amplifier 120, WDM light in which signal light (first signal light) and dummy light are combined (multiplexed). For example, the transmitter 111 includes a light source that generates the signal light, a light source that generates the dummy light, and a combiner that combines the signal light and the dummy light. The transmitter 111 may include a combiner that combines signal light and dummy light that are input from an external source.

The signal light may include signal lights of different wavelengths. The dummy light is light having a wavelength different from the signal light and, for example, is continuous wave (CW) light. However, the dummy light is not limited to the CW light and may be any light. The dummy light may include dummy lights of different wavelengths.

The receiver 112 receives signal light included in WDM light transmitted from the second amplifier 140. For example, the receiver 112 separates (demultiplexes) the WDM light into the signal light and dummy light, and receives the separated signal light.

The controller 113 is a power controller that controls the power of the dummy light combined by the transmitter 111. For example, the transmitter 111 includes a variable amplifier that amplifies the dummy light by a variable gain, and the controller 113 controls the gain of the variable amplifier. Alternatively, the transmitter 111 includes a variable attenuator that attenuates the dummy light by a variable attenuation amount, and the controller 113 controls the attenuation amount of the variable attenuator. Alternatively, if the transmitter 111 includes a light source that generates the dummy light, the controller 113 may control the power of the dummy light generated by the light source. The controller 113 is implemented by a CPU and a program that is parsed and executed by the CPU, details are described later. Alternatively, the controller 113 may be implemented by a field-programmable gate array (FPGA).

The first amplifier 120 amplifies to a constant power (automatic level control), the WDM light transmitted from the first communication device 110, and transmits the amplified WDM light to the second communication device 130. The first amplifier 120 is provided in, for example, a relay between the first communication device 110 and the second communication device 130.

The second communication device 130 includes a separator 131, a variable transmission unit 132, and a combiner 133. The separator 131 separates the dummy light from the WDM light transmitted from the first amplifier 120. The separator 131 may separate all or a part of the dummy light included in the WDM light. The separator 131 outputs the separated dummy light to the variable transmission unit 132. The separator 131 also outputs the signal light separated from the WDM light.

The variable transmission unit 132 has a variable transmittance and transmits the dummy light output from the separator 131. The dummy light that has passed through the variable transmission unit 132 is output to the combiner 133. For example, the variable transmission unit 132 may be implemented by an optical filter having wavelength transmission characteristics where the transmittance differs according to the wavelength of light. The transmittance of the variable transmission unit 132 can be changed by controlling the wavelength of the dummy light. Alternatively, the variable transmission unit 132 may be implemented by a variable optical attenuator (VOA) for which attenuation changes according to settings. In this case, the transmittance of the variable transmission unit 132 can be changed by a control signal input to the VOA.

Signal light (second signal light) to be transmitted to the first communication device 110 and the dummy light output from the variable transmission unit 132 are input to the combiner 133, which combines the signal light and the dummy light into WDM light and transmits the WDM light to the second amplifier 140.

The second communication device 130 may include a forwarding unit (for example, an OADM circuit) that forwards the signal light output from the separator 131 to another communication device, and/or a receiver that receives (terminates) the signal light output from the separator 131. The second communication device 130 may include a forwarding unit (for example, an OADM circuit) that inputs signal light transmitted from another communication device to the combiner 133 as the second signal light, and/or a transmitter that generates the second signal light input to the combiner 133.

The second amplifier 140 amplifies to a constant power (automatic level control), the WDM light transmitted from the second communication device 130 and transmits the amplified WDM light to the first communication device 110. The second amplifier 140 is provided in, for example, a relay between the second communication device 130 and the first communication device 110.

A controller that controls the transmittance of the variable transmission unit 132 of the second communication device 130 is provided in, for example, the first communication device 110. Thus, the power of signal light on the lines 101 and 102 can be respectively adjusted by the first communication device 110. For example, if the variable transmission unit 132 is implemented by an optical filter having wavelength transmission characteristics, a controller that controls the wavelength of the dummy light combined by the transmitter 111 of the first communication device 110 is provided in the first communication device 110.

For example, a variable light source that generates dummy light of variable wavelength may be provided in the transmitter 111. The wavelength of the dummy light can be controlled by controlling the variable light source of the transmitter 111. The controller that controls the transmittance of the variable transmission unit 132 and the power controller that controls the power of the dummy light may be implemented by a single control circuit, or separate control circuits. The controller that controls the transmittance of the variable transmission unit 132 may be provided in a device different from the first communication device 110.

The communication system 100 depicted in FIG. 1 can adjust the power of the dummy light included in the WDM light amplified by the first amplifier 120 by controlling, by the controller 113, the power of the dummy light included in the WDM light transmitted by the transmitter 111. Thus, the power of the signal light included in the WDM light amplified by the automatic level control of the first amplifier 120 can be adjusted.

Further, the power of the dummy light included in the WDM light amplified by the second amplifier 140 can be adjusted by controlling the transmittance of the dummy light at the variable transmission unit 132. Thus, the power of the signal light included in the WDM light amplified by the automatic level control of the second amplifier 140 can be adjusted.

Accordingly, for example, even when the number of wavelengths of signal light in the WDM light differs between the lines 101 and 102, the power of the signal light on the lines 101 and 102 can be respectively adjusted by separately adjusting the power of the dummy light on the lines 101 and 102. Thus, for example, the power of the signal light can be prevented from becoming too high and deterioration of the signal light due to the nonlinear effect of the transmission path can be prevented. Further, for example, the power of the signal light can be prevented from becoming too low and the optical signal noise ratio (OSNR) can be prevented from decreasing. Thus, the communication quality can be improved.

Further, the power of the signal light on the lines 101 and 102 can be respectively adjusted without separately setting the output power of the first amplifier 120 and the second amplifier 140 provided on the lines 101 and 102, respectively. Thus, the types of the amplifier can be reduced since amplifiers of the same type can be used as the first amplifier 120 and the second amplifier 140. Thus, the efficiency of maintenance and/or operation can be improved. In particular, if the first amplifier 120 and the second amplifier 140 are provided in a device of which maintenance and/or operation are difficult (such as a submarine repeater), the efficiency of maintenance and/or operation can be improved by using amplifiers of the same type as the first amplifier 120 and the second amplifier 140.

A light source for dummy light need not to be provided on the transmission side of the line 102 (e.g., the second communication device 130) since the dummy light on the line 101 is turned back and combined into the line 102, enabling simplification of a device on the transmission side of the line 102 and reduction of the power consumption on the transmission side of the line 102.

The second communication device 130 can be simplified and the reliability can be improved by implementing the variable transmission unit 132 by a passive optical filter. Thus, even when the second communication device 130 is applied to, for example, a submarine branching unit, maintenance and/or operation of the second communication device 130 can be facilitated due to the improved reliability of the second communication device 130.

In the above description, the line 102 is a line between the second communication device 130 and the first communication device 110 and the receiver 112 is provided in the first communication device 110. However, the receiver 112 may be provided in a communication device different from the first communication device 110. In this case, the line 102 is a line between the communication device in which the receiver 112 is provided and the second communication device 130.

Figure 2:
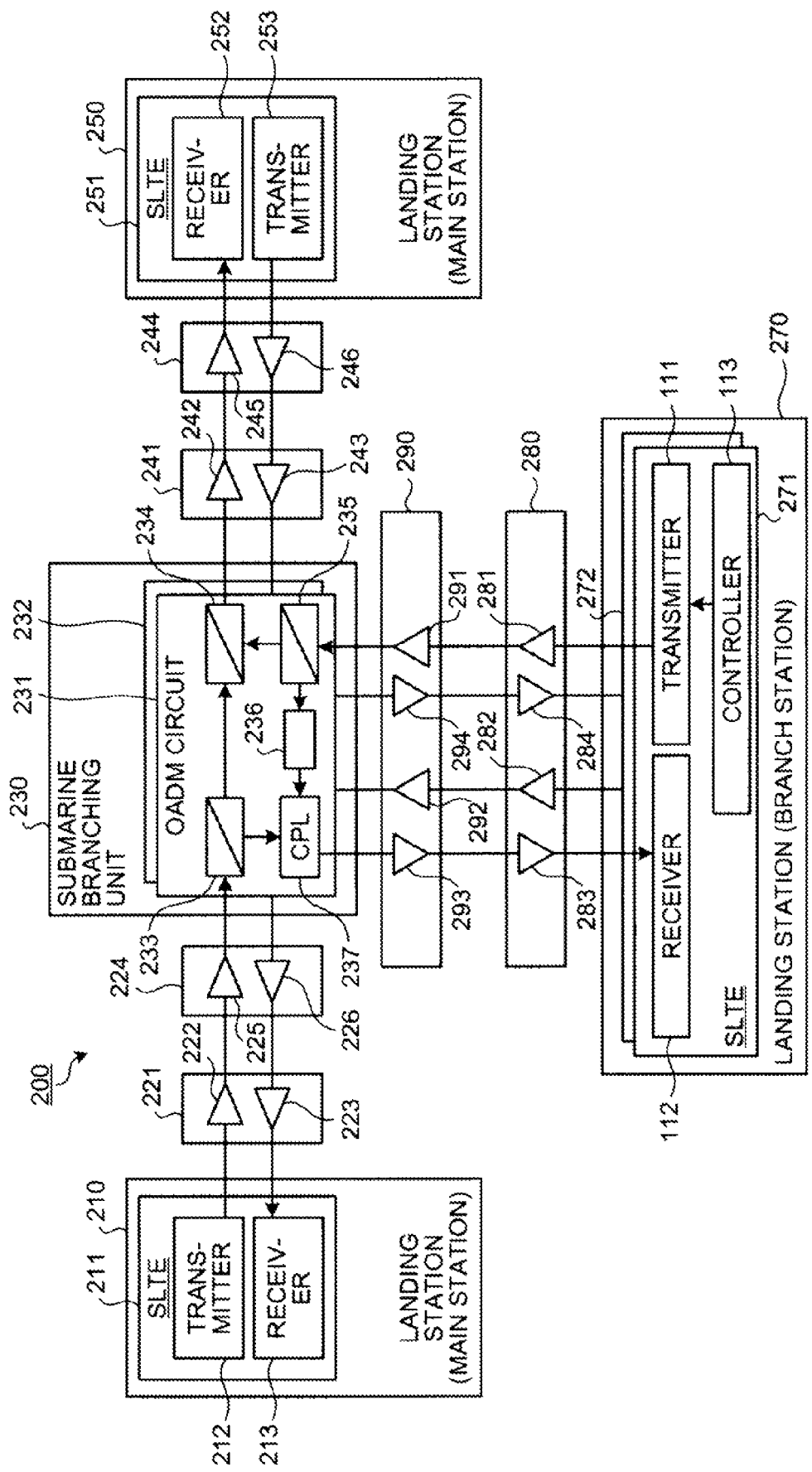
FIG. 2 is a diagram of an example of an application of the communication system depicted in FIG. 1.

FIG. 2 is a diagram of an example of an application of the communication system depicted in FIG. 1. A submarine communications system 200 depicted in FIG. 2 is an example of a submarine communications system to which the communication system 100 depicted in FIG. 1 is applied. As depicted in FIG. 2, the submarine communications system 200 includes a landing station 210, submarine repeaters 221 and 224, a submarine branching unit 230, submarine repeaters 241 and 244, a landing station 250, submarine repeaters 290 and 280, and a landing station 270.

An optical line that transmits light from the landing station 210 to the landing station 250 through the submarine branching unit 230 is assumed to be an upstream trunk line. An optical line that transmits light from the landing station 250 to the landing station 210 through submarine branching unit 230 is assumed to be a downstream trunk line. An optical line that transmits light branched from the upstream trunk line or the downstream trunk line from the submarine branching unit 230 to the landing station 270 is assumed to be a downstream branch line. An optical line that transmits light from the landing station 270 to the submarine branching unit 230 is assumed to be an upstream branch line. The signal light transmitted through the upstream branch line is added to the upstream trunk line or the downstream trunk line by the submarine branching unit 230, and transmitted to the landing station 210 or the landing station 250.

The landing station 210 includes submarine line terminal equipment (SLTE) 211 that includes a transmitter 212 and a receiver 213. The transmitter 212 transmits to the submarine repeater 221, WDM light in which lights of different wavelengths are multiplexed. The WDM light transmitted by the transmitter 212 includes, for example, signal light of at least one wavelength and dummy light. The receiver 213 receives signal light included in WDM light transmitted from the submarine repeater 221.

The submarine repeater 221 includes amplifiers 222 and 223. The amplifier 222 amplifies to a constant power, the WDM light transmitted from the landing station 210 and transmits the amplified WDM light to the submarine repeater 224. The amplifier 223 amplifies to a constant power, WDM light transmitted from the submarine repeater 224 and transmits the amplified WDM light to the landing station 210.

The submarine repeater 224 includes amplifiers 225 and 226. The amplifier 225 amplifies the WDM light transmitted from the submarine repeater 221 to a constant power, and transmits the amplified WDM light to the submarine branching unit 230. The amplifier 226 amplifies to a constant power, WDM light transmitted from the submarine branching unit 230 and transmits the amplified WDM light to the submarine repeater 221.

The submarine branching unit 230 includes OADM circuits 231 and 232 (add/drop device) each of which has a configuration corresponding to the second communication device 130 depicted in FIG. 1. The OADM circuit 231 adds/drops light to/from the upstream WDM light from the landing station 210 to the landing station 250. For example, the OADM circuit 231 includes a demultiplexer 233, a multiplexer 234, a demultiplexer 235, an optical filter 236, and an optical coupler (CPL) 237.

The demultiplexer 233 is a branching unit that separates arbitrary signal light included in the WDM light transmitted from the submarine repeater 224 and outputs the signal light to the optical coupler 237. The demultiplexer 233 outputs the WDM light excluding the signal light separated and output to the optical coupler 237 to the multiplexer 234. The multiplexer 234 is an inserting unit that multiplexes signal light output from the demultiplexer 235 into the WDM light output from the demultiplexer 233 and transmits the WDM light to the submarine repeater 241.

The demultiplexer 235 has a configuration corresponding to the separator 131 depicted in FIG. 1. WDM light that is transmitted from the submarine repeater 290 and includes an add signal to the upstream trunk line is input to the demultiplexer 235 that separates signal light and dummy light included in the WDM light and outputs the separated signal light and dummy light to the multiplexer 234 and the optical filter 236, respectively.

The optical filter 236 has a configuration corresponding to the variable transmission unit 132 depicted in FIG. 1, and transmits towards the optical coupler 237, the dummy light output from the demultiplexer 235. The optical filter 236 has wavelength transmission characteristics where the transmittance differs according to the wavelength. Thus, the dummy light output from the demultiplexer 235 can be attenuated to a power according to the wavelength of the dummy light, and output to the optical coupler 237. An amplifier that amplifies the dummy light may be provided at the input/output of the optical filter 236, thereby increasing the power of the dummy light output from the demultiplexer 235 to the optical coupler 237. The amplifier that amplifies the dummy light is, for example, an amplifier with a fixed gain. Thus, the configuration of the OADM circuit 231 can be simplified.

The optical coupler 237 has a configuration corresponding to the combiner 133 depicted in FIG. 1, combines (multiplexes) the signal light output from the demultiplexer 233 and the dummy light output from the optical filter 236, and outputs the combined WDM light to the submarine repeater 290 as WDM light that includes a drop signal from the upstream trunk line.

The demultiplexer 233, the multiplexer 234, the demultiplexer 235, and the optical filter 236 of the OADM circuit 231 can be implemented by a bandpass filter. A dielectric multilayer film, a fiber bragg grating (FBG), etc., can be used as the bandpass filter.

Alternatively, the demultiplexer 235 and the optical filter 236 can be implemented by a single optical filter that outputs the band of the signal light to the multiplexer 234 and outputs to the optical coupler 237, a given amount of the band of the dummy light according to the wavelength. Thus, the configuration of the OADM circuit 231 can be simplified.

The OADM circuit 232 adds/drops light to/from the downstream WDM light from the landing station 250 to the landing station 210. For example, the OADM circuit 232 has the same configuration as the OADM circuit 231 except that the downstream WDM light transmitted from the submarine repeater 241 is input to the demultiplexer 233 of the OADM circuit 232.

The multiplexer 234 of the OADM circuit 232 transmits the downstream WDM light to the submarine repeater 224. The demultiplexer 235 of the OADM circuit 232 demultiplexes WDM light that is transmitted from the submarine repeater 290 and includes an add signal to the downstream trunk line. The optical coupler 237 of the OADM circuit 232 outputs the combined WDM light to the submarine repeater 290 as WDM light that includes a drop signal from the downstream trunk line.

The submarine repeater 241 includes amplifiers 242 and 243. The amplifier 242 amplifies to a constant power, the WDM light transmitted from the submarine branching unit 230 and transmits the amplified WDM light to the submarine repeater 244. The amplifier 243 amplifies to a constant power, WDM light transmitted from the submarine repeater 244 and transmits the amplified WDM light to the submarine branching unit 230.

The submarine repeater 244 includes amplifiers 245 and 246. The amplifier 245 amplifies to a constant power, the WDM light transmitted from the submarine repeater 241 and transmits the amplified WDM light to the landing station 250. The amplifier 246 amplifies to a constant power, a WDM light transmitted from the landing station 250 and transmits the amplified WDM light to the submarine repeater 241.

The landing station 250 includes an SLTE 251 that includes a receiver 252 and a transmitter 253. The receiver 252 receives signal light included in the WDM light transmitted from the submarine repeater 244. The transmitter 253 transmits to the submarine repeater 221, WDM light in which lights of different wavelengths are multiplexed. The WDM light transmitted by the transmitter 253 includes, for example, signal light of at least one wavelength and dummy light.

The landing station 270 includes SLTEs 271 and 272 each of which has a configuration corresponding to the first communication device 110 depicted in FIG. 1. The SLTE 271 transmits an add signal to the upstream trunk line and receives a drop signal from the upstream trunk line. For example, the landing station 270 includes a transmitter 111, a controller 113, and a receiver 112.

The transmitter 111 transmits to the submarine repeater 280, WDM light that includes an add signal to the upstream trunk line and a dummy light. WDM light that is transmitted from the submarine repeater 280 and includes a drop signal from the upstream trunk line and dummy light is input to the receiver 112 that receives the drop signal included in the input WDM light.

The controller 113 adjusts the power of the dummy light transmitted along with the add signal to the upstream trunk line by controlling the power of the dummy light included in the WDM light transmitted by the transmitter 111. Thus, the power of the add signal to the upstream trunk line transmitted by the transmitter 111 and amplified by the submarine repeaters 280 and 290 can be adjusted. The controller 113 controls the wavelength of the dummy light included in the WDM light transmitted by the transmitter 111. Thus, the power of the drop signal from the upstream trunk line amplified by the submarine repeaters 290 and 280 and received by the receiver 112 can be adjusted.

The SLTE 272 transmits an add signal to the downstream trunk line and receives a drop signal from the downstream trunk line. For example, the SLTE 272 has the same configuration as the SLTE 271. The transmitter 111 of the SLTE 272 transmits to the submarine repeater 280, WDM light that includes an add signal to the downstream trunk line and dummy light. WDM light that is transmitted from the submarine repeater 280 and includes a drop signal from the downstream trunk line and a dummy light is input to the receiver 112 of the SLTE 272. The receiver 112 of the SLTE 272 receives the drop signal included in the WDM light.

The controller 113 of the SLTE 272 adjusts the power of the dummy light transmitted along with the add signal to the downstream trunk line by controlling the power of the dummy light included in the WDM light transmitted by the transmitter 111 of the SLTE 272. Thus, the power of the add signal to the downstream trunk line transmitted by the transmitter 111 of the SLTE 272 and amplified by the submarine repeaters 280 and 290 can be adjusted.

The controller 113 of the SLTE 272 controls the wavelength of the dummy light included in the WDM light transmitted by the transmitter 111 of the SLTE 272. Thus, the power of the drop signal from the downstream trunk line amplified by the submarine repeaters 290 and 280 and received by the receiver 112 of the SLTE 272 can be adjusted.

The submarine repeater 280 includes amplifiers 281 to 284. Each of the amplifiers 281 and 282 has a configuration corresponding to the first amplifier 120 depicted in FIG. 1. The amplifier 281 amplifies to a constant power, the WDM light that is transmitted from the SLTE 271 and includes the add signal to the upstream trunk line, and transmits the amplified WDM light to the submarine repeater 290. The amplifier 282 amplifies the WDM light that is transmitted from the SLTE 272 and includes the add signal to the downstream trunk line to a constant power, and transmits the amplified WDM light to the submarine repeater 290.

Each of the amplifiers 283 and 284 has a configuration corresponding to the second amplifier 140 depicted in FIG. 1. The amplifier 283 amplifies to a constant power, the WDM light that is transmitted from the submarine repeater 290 and includes the drop signal from the upstream trunk line, and transmits the amplified WDM light to the SLTE 271. The amplifier 284 amplifies to a constant power, the WDM light that is transmitted from the submarine repeater 290 and includes the drop signal from the downstream trunk line, and transmits the amplified WDM light to the SLTE 272.

The submarine repeater 290 includes amplifiers 291 to 294. Each of the amplifiers 291 and 292 has a configuration corresponding to the first amplifier 120 depicted in FIG. 1. The amplifier 291 amplifies to a constant power, the WDM light that is transmitted from the submarine repeater 280 and includes the add signal to the upstream trunk line, and transmits the amplified WDM light to the OADM circuit 231. The amplifier 292 amplifies to a constant power, the WDM light that is transmitted from the submarine repeater 280 and includes the add signal to the downstream trunk line, and transmits the amplified WDM light to the OADM circuit 232.

Each of the amplifiers 293 and 294 has a configuration corresponding to the second amplifier 140 depicted in FIG. 1. The amplifier 293 amplifies to a constant power, the WDM light that is transmitted from the OADM circuit 231 and includes the drop signal from the upstream trunk line, and transmits the amplified WDM light to the submarine repeater 280. The amplifier 294 amplifies to a constant power, the WDM light that is transmitted from the OADM circuit 232 and includes the drop signal from the downstream trunk line, and transmits the amplified WDM light to the submarine repeater 280.

The submarine communications system 200 depicted in FIG. 2 can adjust the power of the dummy light on the upstream branch line and the downstream branch line by the receivers 112 of the SLTEs 271 and 272. Thus, the power of the signal light on the upstream branch line and the downstream branch line can be adjusted in an appropriate range. Further, the power of the dummy light on the upstream branch line and the downstream branch line can be adjusted independently from the power of the dummy light on the upstream trunk line and the downstream trunk line. Thus, the power of the signal light on the upstream trunk line, the downstream trunk line, the upstream branch line, and the downstream branch line can be respectively adjusted in an appropriate range.

Figure 3:
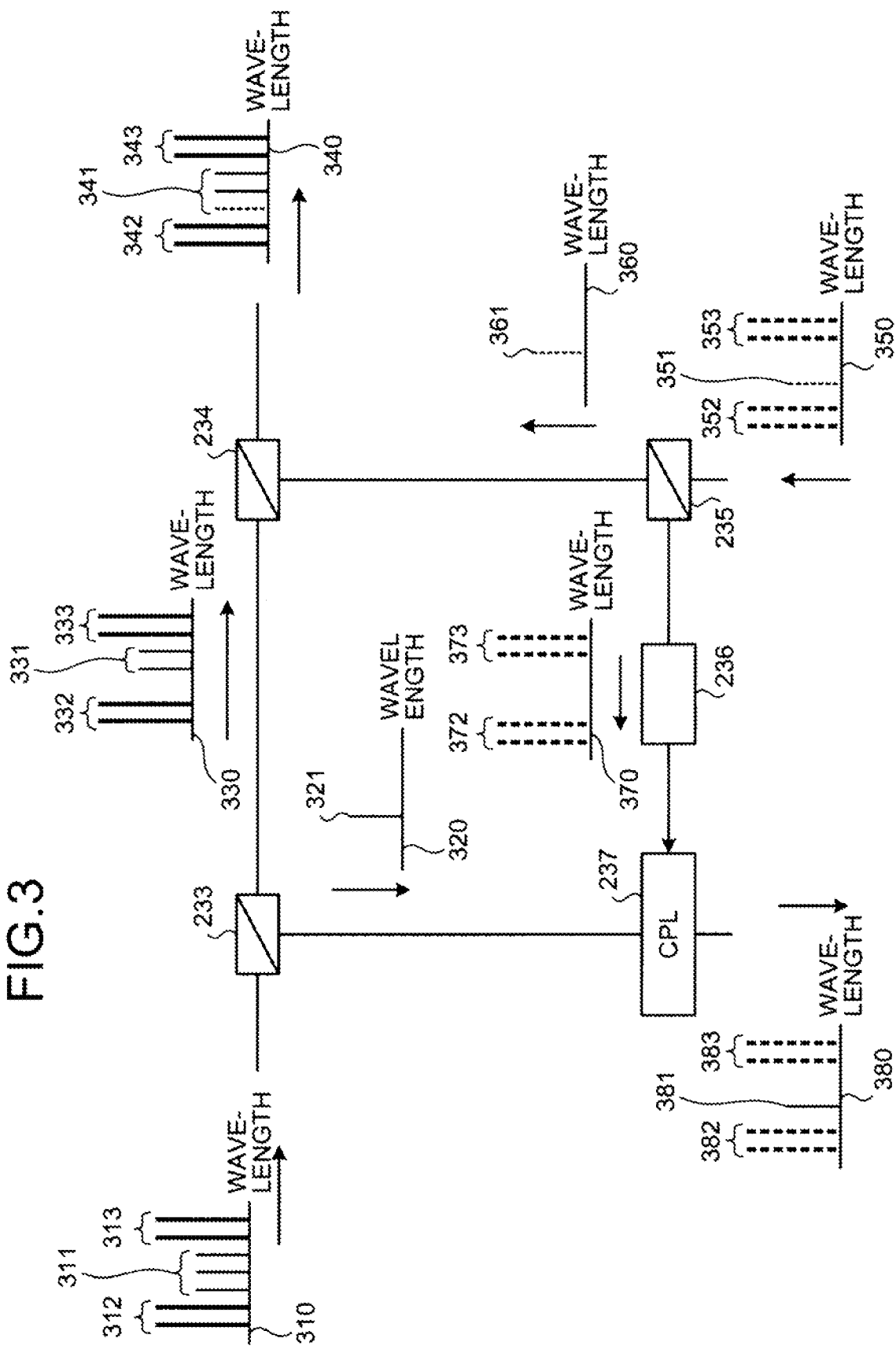
FIG. 3 is a diagram of an example of an arrangement of wavelengths of lights.

FIG. 3 is a diagram of an example of an arrangement of wavelengths of lights (hereinafter, "wavelength arrangement"). Wavelength arrangements 310, 320, 330, 340, 350, 360, 370, 380 depicted in FIG. 3 indicate wavelength arrangements of light at different points in the OADM circuit 231 depicted in FIG. 2. In each wavelength arrangement, the horizontal axis indicates wavelength, while the vertical axis indicates power.

The wavelength arrangement 310 indicates the wavelength arrangement of the WDM light transmitted from the SLTE 211 to the OADM circuit 231 on the upstream trunk line. As depicted, the WDM light includes signal light 311 and dummy light 312 and 313.

The wavelength arrangement 320 indicates the wavelength arrangement of signal light 321 separated by the demultiplexer 233 and output to the optical coupler 237. The signal light 321 is arbitrary signal light included in the signal light 311 depicted in the wavelength arrangement 310.

The wavelength arrangement 330 indicates the wavelength arrangement of the WDM light inside the OADM circuit 231 (for example, between the demultiplexer 233 and the multiplexer 234). As depicted, the WDM light includes signal light 331 and dummy lights 332 and 333. The wavelength arrangement 330 is the wavelength arrangement 310 from which the signal light 321 depicted in the wavelength arrangement 320 has been removed.

The wavelength arrangement 340 indicates the wavelength arrangement of the WDM light transmitted from the OADM circuit 231 to the SLTE 251 on the upstream trunk line. As depicted, the WDM light includes signal light 341 and dummy light 342 and 343. The wavelength arrangement 340 includes the wavelength arrangement 330 and signal light 361 from the landing station 270 combined by the multiplexer 234.

The wavelength arrangement 350 indicates the wavelength arrangement of the WDM light that is transmitted from the landing station 270 to the OADM circuit 231 and includes the add signal to the upstream trunk line. As depicted, the WDM light includes signal light 351 and dummy light 352 and 353.

The wavelength arrangement 360 indicates the wavelength arrangement of the signal light 361 separated by the demultiplexer 235. As depicted, the signal light 361 is the signal light 351 depicted in and separated from the wavelength arrangement 350. The wavelength arrangement 370 indicates the wavelength arrangement of dummy light 372 and dummy light 373 separated by the demultiplexer 235. As depicted, the dummy light 372 and dummy light 373 are the dummy light 352 and dummy light 353 depicted in and extracted from the wavelength arrangement 350.

The wavelength arrangement 380 indicates the wavelength arrangement of the WDM light that is transmitted from the OADM circuit 231 to the landing station 270 and includes the drop signal from the upstream trunk line. As depicted, the WDM light includes signal light 381 and dummy light 382 and 383. The signal light 381 is the signal light 321 depicted in the wavelength arrangement 320. Dummy light 382 and dummy light 383 are the dummy light 372 and dummy light 373 depicted in the wavelength arrangement 370.

Figure 4:
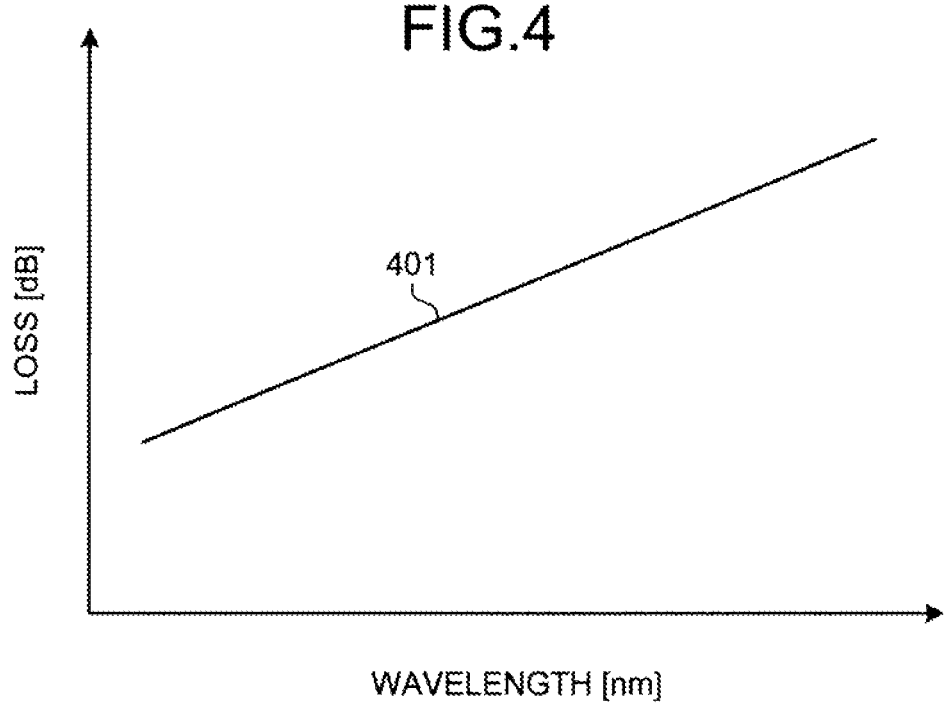
FIG. 4 is a diagram of an example of wavelength transmission characteristics of an optical filter.

FIG. 4 is a diagram of an example of wavelength transmission characteristics of the optical filter. In FIG. 4, the horizontal axis indicates the wavelength (unit: nm) of the light input to the optical filter 236. The vertical axis indicates the loss (unit: dB) of the light transmitted through the optical filter 236. Wavelength transmission characteristics 401 indicate characteristics of the loss of the optical filter 236 with respect to the wavelength. As depicted, the optical filter 236 has characteristics where the loss (transmittance) differs according to the wavelength.

Thus, the power of the dummy light that passes through the optical filters 236 can be adjusted by controlling the wavelength of the dummy light by the controllers 113 of the SLTEs 271 and 272. Thus, the power of the dummy light included in the WDM light transmitted from the OADM circuits 231 and 232 to the SLTEs 271 and 272 via the submarine repeaters 290 and 280 can be adjusted. Thus, the power of the signal light included in the WDM light received by the SLTEs 271 and 272 can be adjusted.

Figure 5:
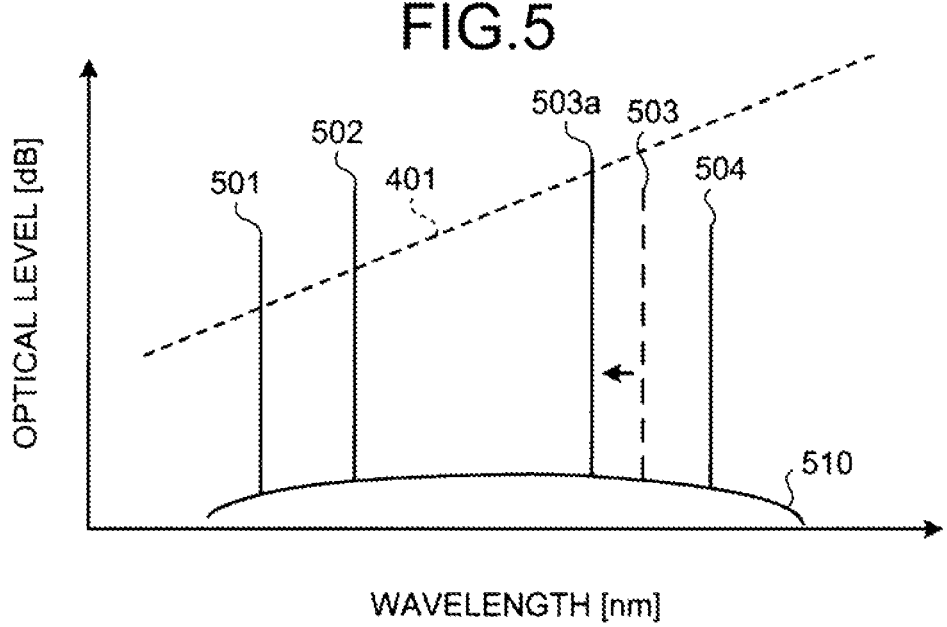
FIG. 5 is a diagram of an example of a change in the power of dummy light according to control of the wavelength of the dummy light.

FIG. 5 is a diagram of an example of a change in the power of the dummy light according to the control of the wavelength of the dummy light. In FIG. 5, the horizontal axis indicates the wavelength (unit: nm) of the light input to the optical filter 236. The vertical axis indicates the level (optical level) (unit: dB) of the light that has passed through the optical filter 236. Dummy light 501 to dummy light 504 are examples of dummy light that has passed through the optical filter 236. Noise 510 is optical noise that has passed through the optical filter 236. The wavelength transmission characteristics 401 are the wavelength transmission characteristics of the optical filter 236 depicted in FIG. 4.

For example, if the wavelength of the dummy light 503 becomes shorter, the loss of the dummy light 503 becomes smaller due to the wavelength transmission characteristics 401 of the optical filter 236. Thus, the optical level of the dummy light 503 becomes higher as indicated by dummy light 503a. As described above, the optical filter 236 has the wavelength transmission characteristics 401 where the loss (transmittance) differs according to the wavelength. Thus, the power of the dummy light turned back from the OADM circuit 231 to the landing station 270 can be changed by controlling the wavelength of the dummy light.

Figure 6:
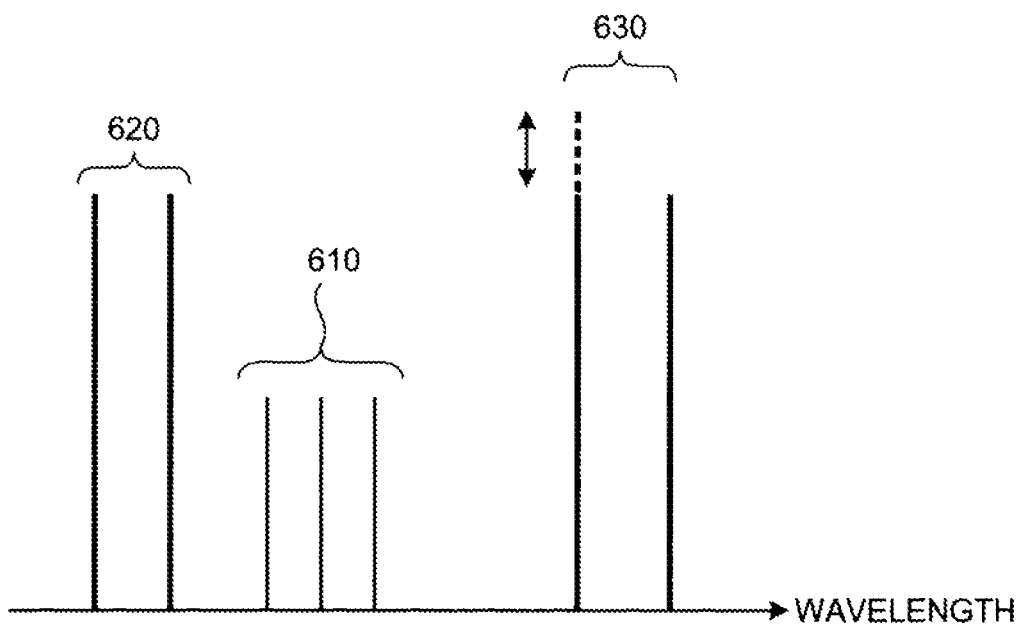
FIG. 6 is a diagram of an example of an adjustment of the power of dummy light on an upstream branch line.

FIG. 6 is a diagram of an example of an adjustment of the power of the dummy light on the upstream branch line. In FIG. 6, the horizontal axis indicates the wavelength of light, while the vertical axis indicates the power of light. Signal light 610 and dummy light 620 and 630 are examples of the signal light and the dummy light included in, for example, the WDM light transmitted from the SLTE 271 to the OADM circuit 231 (upstream branch line). The power of the dummy light 620 and 630 can be changed by controlling, by the controller 113, the power of the dummy light combined to the signal light by the transmitter 111.

Figure 7:
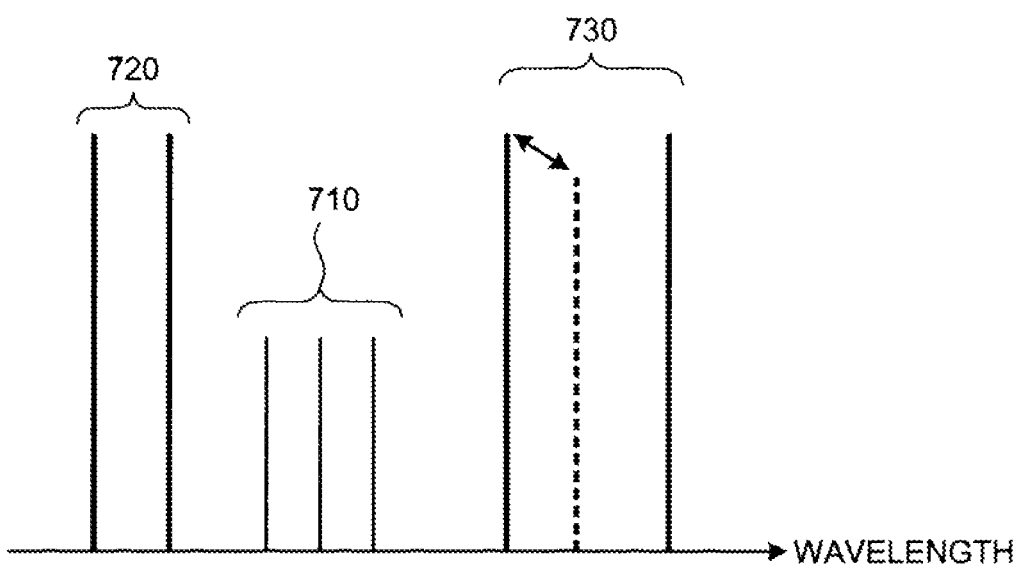
FIG. 7 is a diagram of an example of an adjustment of the power of dummy light on a downstream branch line.

FIG. 7 is a diagram of an example of an adjustment of the power of the dummy light on the downstream branch line. In FIG. 7, the horizontal axis indicates the wavelength of light, while the vertical axis indicates the power of light. Signal light 710 and dummy light 720 and 730 are examples of the signal light and the dummy light included in, for example, the WDM light transmitted from the OADM circuit 231 to the SLTE 271 (downstream branch line). The power of the dummy light 720 and 730 can be changed by controlling, by the controller 113, the wavelength of the dummy light combined to the signal light by the transmitter 111.

Figure 8:
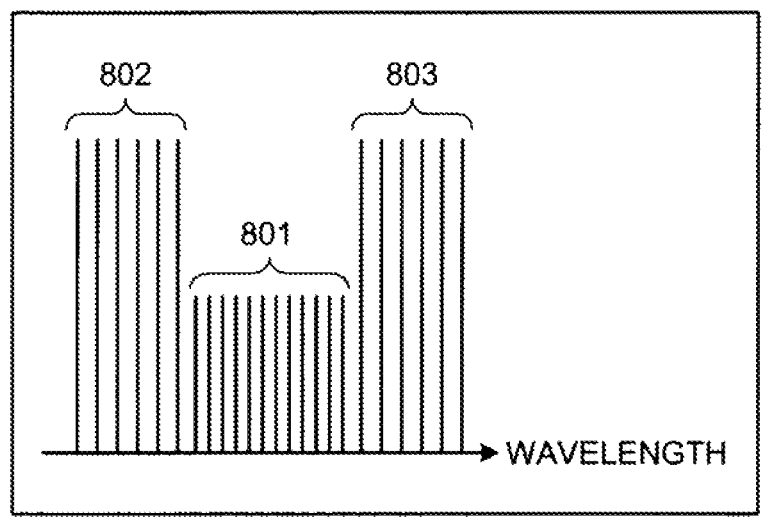
FIG. 8 is a diagram of an example of WDM light on the upstream branch line.

FIG. 8 is a diagram of an example of the WDM light on the upstream branch line. Signal light 801 and dummy light 802 and dummy light 803 depicted in FIG. 8 are examples of the signal light and the dummy light included in the WDM light transmitted from the SLTE 271 to the OADM circuit 231 (upstream branch line). It is assumed that the signal light 801 includes signal light of different wavelengths and the same power. It is further assumed that the dummy light 802 and the dummy light 803 each includes dummy lights of different wavelengths and the same power. The dummy lights included in the dummy light 802 are set to have shorter wavelengths than the signal lights of the signal light 810. The dummy lights included in the dummy light 803 are set to have longer wavelengths than the signal lights of the signal light 810.

Figure 9:
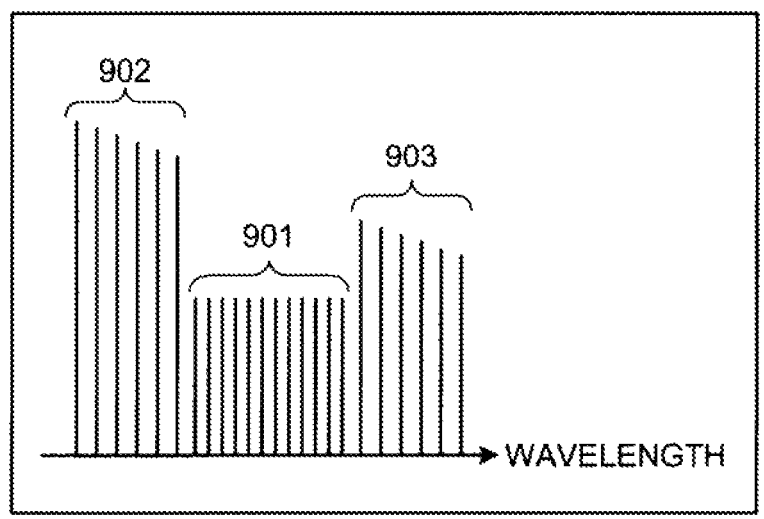
FIG. 9 is a diagram of an example of WDM light on the downstream branch line.

FIG. 9 is a diagram of an example of the WDM light on the downstream branch line. If the optical filter 236 has the wavelength transmission characteristics 401 depicted in FIG. 4 and the WDM light depicted in FIG. 8 is transmitted on the upstream branch line, the WDM light transmitted from the OADM circuit 231 depicted in FIG. 2 to the SLTE 271 (downstream branch line) includes signal light 901 and dummy light 902 and 903. In the dummy light 902 and 903, the longer the wavelength is, the lower the power becomes since the dummy light 902 and 903 have passed through the optical filter 236 having the wavelength transmission characteristics 401 where the longer the wavelength is, the larger the loss becomes.

FIG. 10 is a diagram of a first variation of the wavelength transmission characteristics of the optical filter. In FIG. 10, description of the same portions as those depicted in FIG. 4 is omitted. The optical filter 236 may have wavelength transmission characteristics 1001 depicted in FIG. 10 where the loss is constant in a signal band 1002 that encompasses the wavelengths of the signal light. The longer the wavelength is, the smaller the loss becomes for the wavelengths shorter than the signal band 1002. On the other hand, the longer the wavelength is, the larger the loss becomes for the wavelengths longer than the signal band 1002.

FIG. 11 is a diagram of an example of the WDM light on the downstream branch line corresponding to the first variation depicted in FIG. 10. If the optical filter 236 has the wavelength transmission characteristics 1001 depicted in FIG. 10 and the WDM light depicted in FIG. 8 is transmitted on the upstream branch line, the WDM light transmitted from the OADM circuit 231 depicted in FIG. 2 to the SLTE 271 (downstream branch line) includes signal light 1101 and dummy light 1102 and 1103.

The dummy light 1102 is set to have wavelengths shorter than the signal band 1002 depicted in FIG. 10. Thus, the longer the wavelength of the dummy light 1102 is, the higher the power becomes. On the other hand, the dummy light 1103 is set to have wavelengths longer than the signal band 1002 depicted in FIG. 10. Thus, the longer the wavelength of the dummy light 1103 is, the lower the power becomes.

The power of the dummy light 1102 and 1103 included in the WDM light on the downstream branch line can be dynamically changed by bringing the wavelengths of the dummy lights 802 and 803 depicted in FIG. 8 closer to or farther from the signal band 1002.

Figure 12:
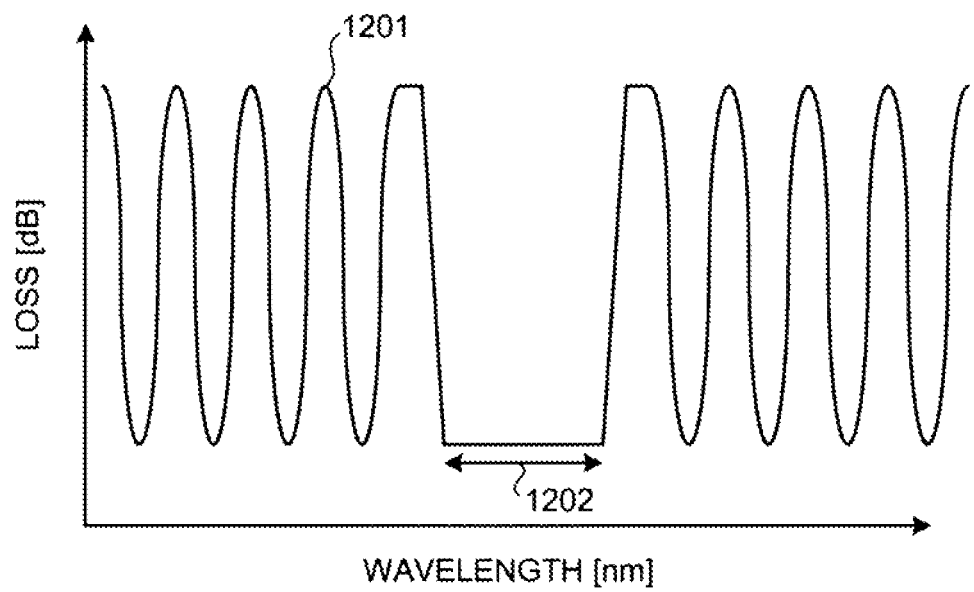
FIG. 12 is a diagram of a second variation of the wavelength transmission characteristics of the optical filter.

FIG. 12 is a diagram of a second variation of the wavelength transmission characteristics of the optical filter. In FIG. 12, description of portions identical to those depicted in FIG. 4 is omitted. The optical filter 236 may have wavelength transmission characteristics 1201 depicted in FIG. 12 where the loss is constant in the signal band 1202 that encompasses the wavelengths of the signal light. The loss periodically changes with respect to the wavelength in the wavelength bands of dummy light on both sides of the signal band 1202.

Figure 13:
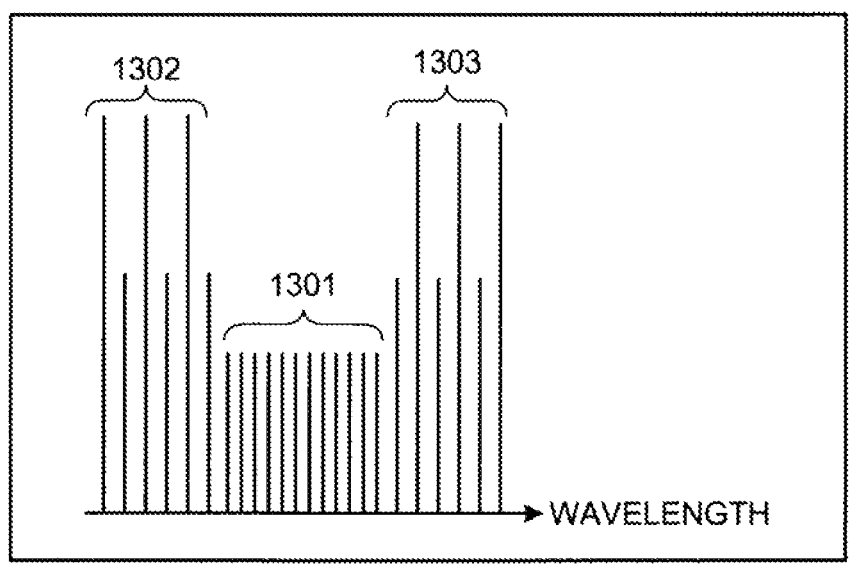
FIG. 13 is a diagram of an example of WDM light on the downstream branch line corresponding to the second variation depicted in FIG. 12.

FIG. 13 is a diagram of an example of the WDM light on the downstream branch line corresponding to the second variation depicted in FIG. 12. If the optical filter 236 has the wavelength transmission characteristics 1201 depicted in FIG. 12 and the WDM light depicted in FIG. 8 is transmitted on the upstream branch line, the WDM light transmitted from the OADM circuit 231 depicted in FIG. 2 to the SLTE 271 (downstream branch line) includes signal light 1301 and dummy light 1302 and 1303.

The wavelengths of the dummy light 1302 and 1303 are set on both sides of the signal band 1202 depicting in FIG. 12. Thus, the power of the dummy light 1302 and 1303 periodically changes with respect to the wavelength. The power of the dummy light 1302 and 1303 included in the WDM light on the downstream branch line can be changed by changing the wavelengths of the dummy light 802 and 803 depicted in FIG. 8. Thus, the power of the signal light 801 received by the receiver 112 can be adjusted by the automatic level control at the submarine repeaters 280 and 290.

Since the loss periodically changes with respect to the wavelength in the wavelength transmission characteristics 1201 of the optical filter 236, the power of the dummy light 1302 and 1303 can be changed even when the change in the wavelengths of the dummy light 802 and 803 is small. Thus, the range of the wavelength of the dummy light combined by the transmitter 111 can be made small, thereby reducing the circuit scale.

Figure 14:
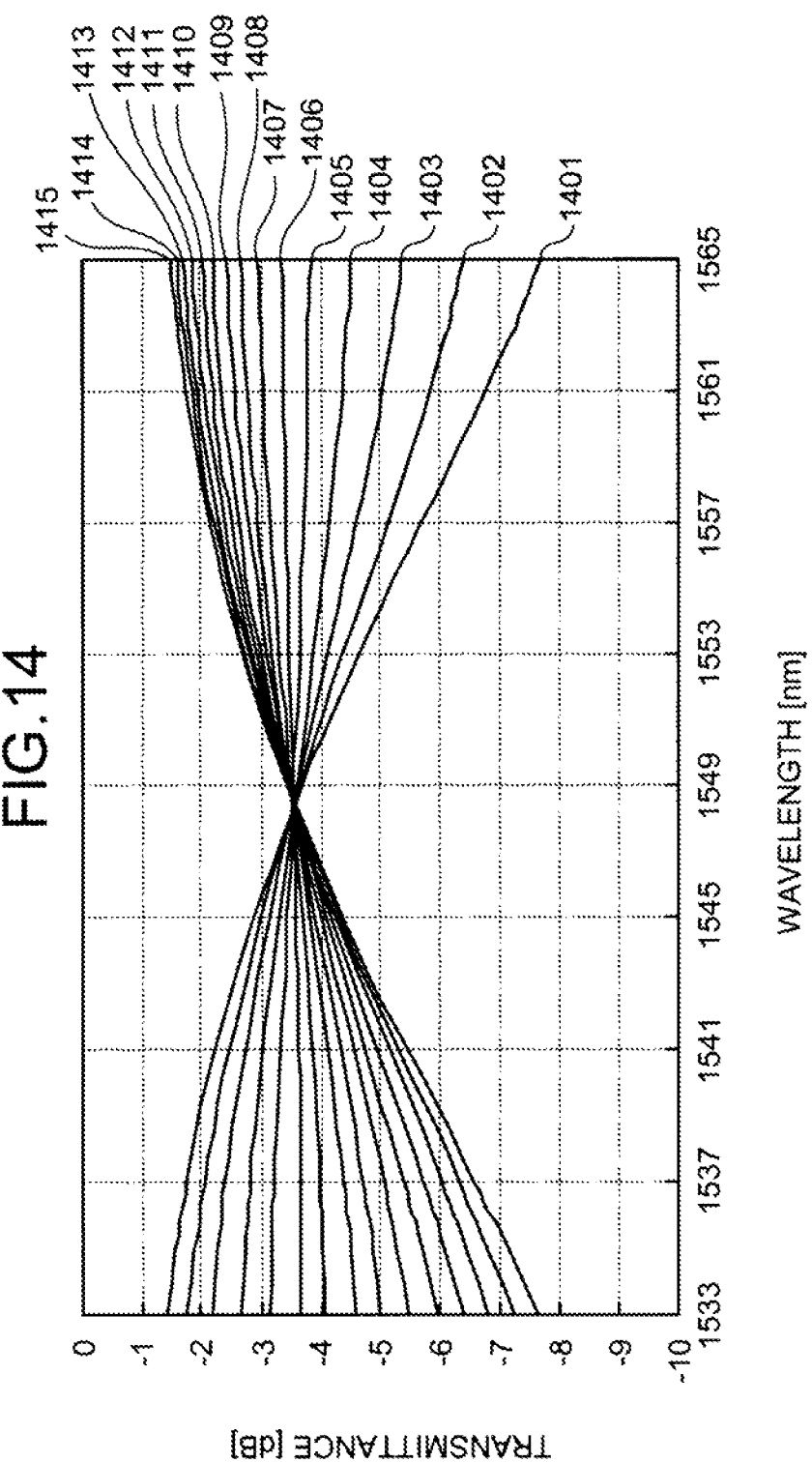
FIG. 14 is a diagram of a third variation of the wavelength transmission characteristics of the optical filter.

FIG. 14 is a diagram of a third variation of the wavelength transmission characteristics of the optical filter. In FIG. 14, the horizontal axis indicates the wavelength (unit: nm) of the light input to the optical filter 236. The vertical axis indicates the transmittance (unit: dB) of the light that passes through the optical filter 236. The optical filter 236 may be a variable filter of which wavelength transmission characteristics can be changed by an external control. Wavelength transmission characteristics 1401 to 1415 indicate wavelength transmission characteristics that can be set to the optical filter 236.

As depicted in the wavelength transmission characteristics 1401 to 1415, the optical filter 236 is, for example, a variable optical filter of which slope of the transmittance with respect to the wavelength can be changed. Thus, the power of the dummy light can be adjusted more flexibly. The wavelength transmission characteristics of the optical filter 236 are controlled by, for example, a control signal transmitted from the controller 113 of the SLTE 271 to the optical filter 236 through the upstream branch line. However, the path for transmitting the control signal is not limited to this, and another path can be used. The wavelength transmission characteristics of the optical filter 236 can be controlled by not only the SLTE 271, but also another device.

Figure 15:
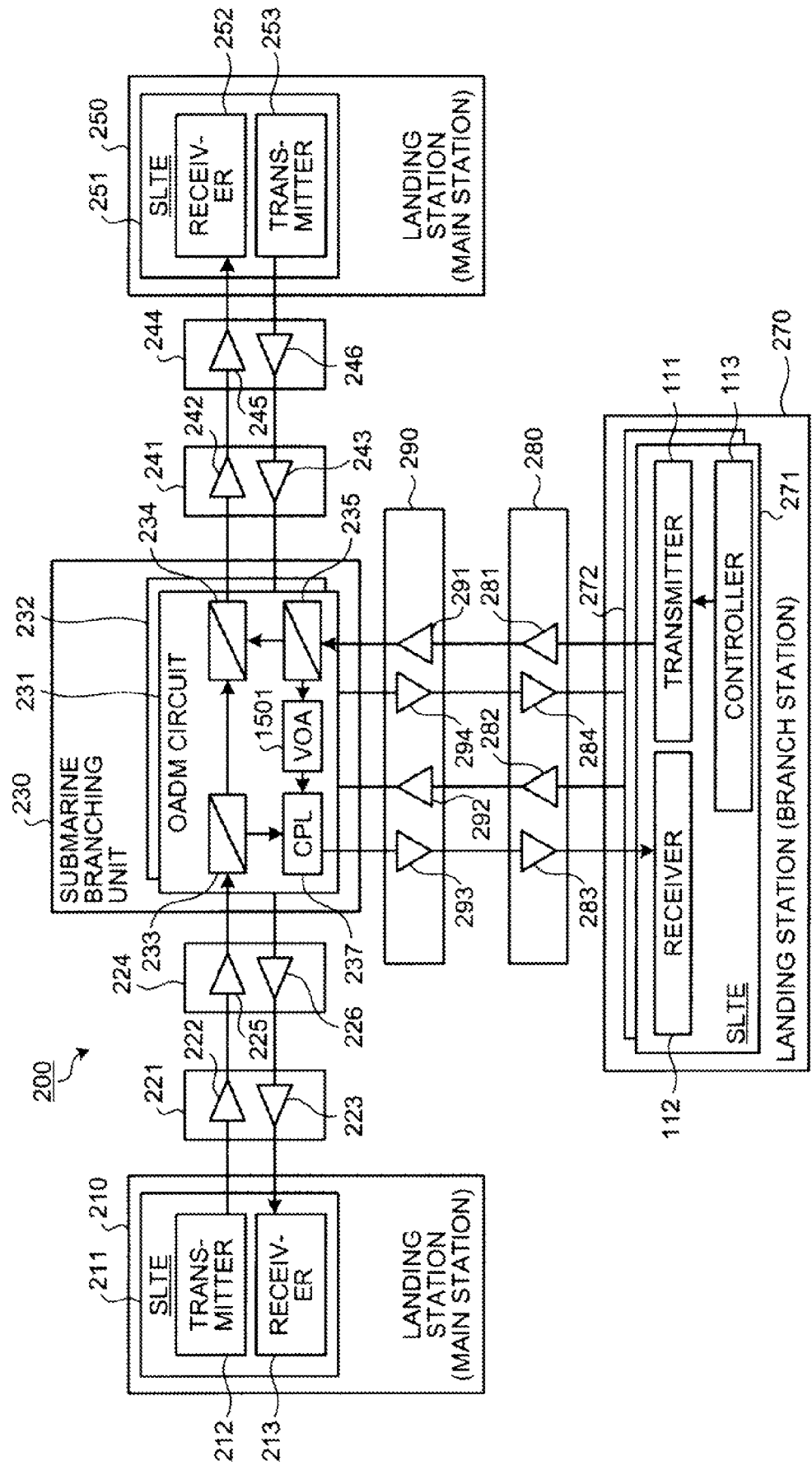
FIG. 15 is a diagram of a variation of the communication system depicted in FIG. 2.

FIG. 15 is a diagram of a variation of the communication system depicted in FIG. 2. In FIG. 15, the portions identical to those depicted in FIG. 2 are assigned the same signs used in FIG. 2, and description thereof is omitted. As depicted in FIG. 15, each of the OADM circuits 231 and 232 may include a VOA 1501 in place of the optical filter 236 depicted in FIG. 2.

The VOA 1501 attenuates the dummy light output from the demultiplexer 235 by a variable attenuation amount, and outputs the attenuated dummy light to the optical coupler 237 that multiplexes the signal light output from the demultiplexer 233 and the dummy light output from the VOA 1501 by combining them.

Thus, the dummy light output from the demultiplexer 235 can be attenuated according to the attenuation amount of the VOA 1501 and output to the optical coupler 237. An amplifier that amplifies the dummy light may be provided at the input/output of the VOA 1501. Thus, the power of the dummy light output from the demultiplexer 235 can be increased and output to the optical coupler 237. The amplifier that amplifies the dummy light is, for example, an amplifier with a fixed gain. Thus, the configuration of the OADM circuit 231 can be simplified.

The attenuation amount of the VOA 1501 is controlled by, for example, a control signal transmitted from the controller 113 of the SLTE 271 to the VOA 1501 through the upstream branch line. However, the path for transmitting the control signal is not limited to this, and another path can be used. The attenuation amount of the VOA 1501 can be controlled by not only the SLTE 271, but also another device.

Figure 16:
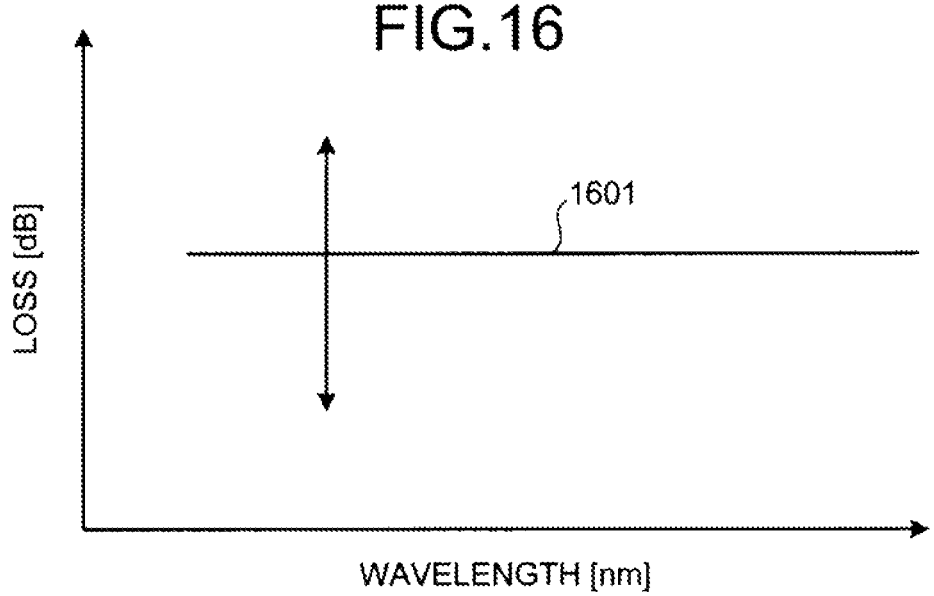
FIG. 16 is a diagram of an example of wavelength transmission characteristics of a VOA.

FIG. 16 is a diagram of an example of wavelength transmission characteristics of the VOA. In FIG. 16, the horizontal axis indicates the wavelength (unit: nm) of the light input to the VOA 1501. The vertical axis indicates the loss (unit: dB) of the light that passes through the VOA 1501. Wavelength transmission characteristics 1601 indicate the characteristics of the loss of the VOA 1501 with respect to the wavelength. As depicted, the VOA 1501 may have characteristics where the loss is constant irrespective of the wavelength. However, the wavelength transmission characteristics 1601 may be changed by an external control such that the loss increases.

Thus, the power of the dummy light that passes through the VOAs 1501 can be adjusted by controlling the wavelength transmission characteristics 1601 by, for example, the controllers 113 of the SLTEs 271 and 272. Thus, the power of the dummy light included in the WDM light transmitted from the OADM circuits 231 and 232 to the SLTEs 271 and 272 via the submarine repeaters 290 and 280 can be adjusted. Thus, the power of the signal light included in the WDM light received by the SLTEs 271 and 272 can be adjusted.

Figure 17:
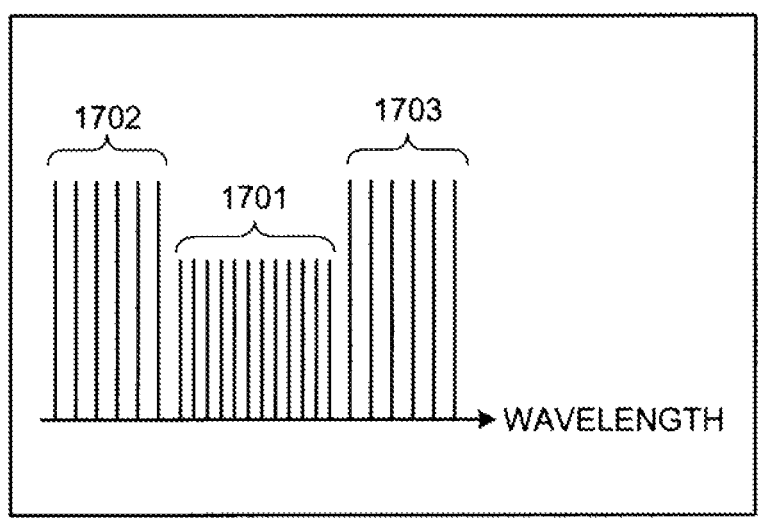
FIG. 17 is a diagram of an example of WDM light on the downstream branch line corresponding to the wavelength transmission characteristics depicted in FIG. 16.

FIG. 17 is a diagram of an example of the WDM light on the downstream branch line corresponding to the wavelength transmission characteristics depicted in FIG. 16. If the VOA 1501 has the wavelength transmission characteristics 1601 depicted in FIG. 16 and the WDM light depicted in FIG. 8 is transmitted on the upstream branch line, the WDM light transmitted from the OADM circuit 231 depicted in FIG. 15 to the SLTE 271 (downstream branch line) includes signal light 1701 and dummy light 1702 and 1703.

The power of the dummy light 1702 and 1703 is constant irrespective of the wavelength. The power of the dummy light 1702 and 1703 included in the WDM light on the downstream branch line can be changed by changing the wavelength transmission characteristics 1601 depicted in FIG. 16 such that the loss increases. Thus, the power of the signal light 1701 received by the receiver 112 can be adjusted by the automatic level control at the submarine repeaters 280 and 290.

Figure 18:
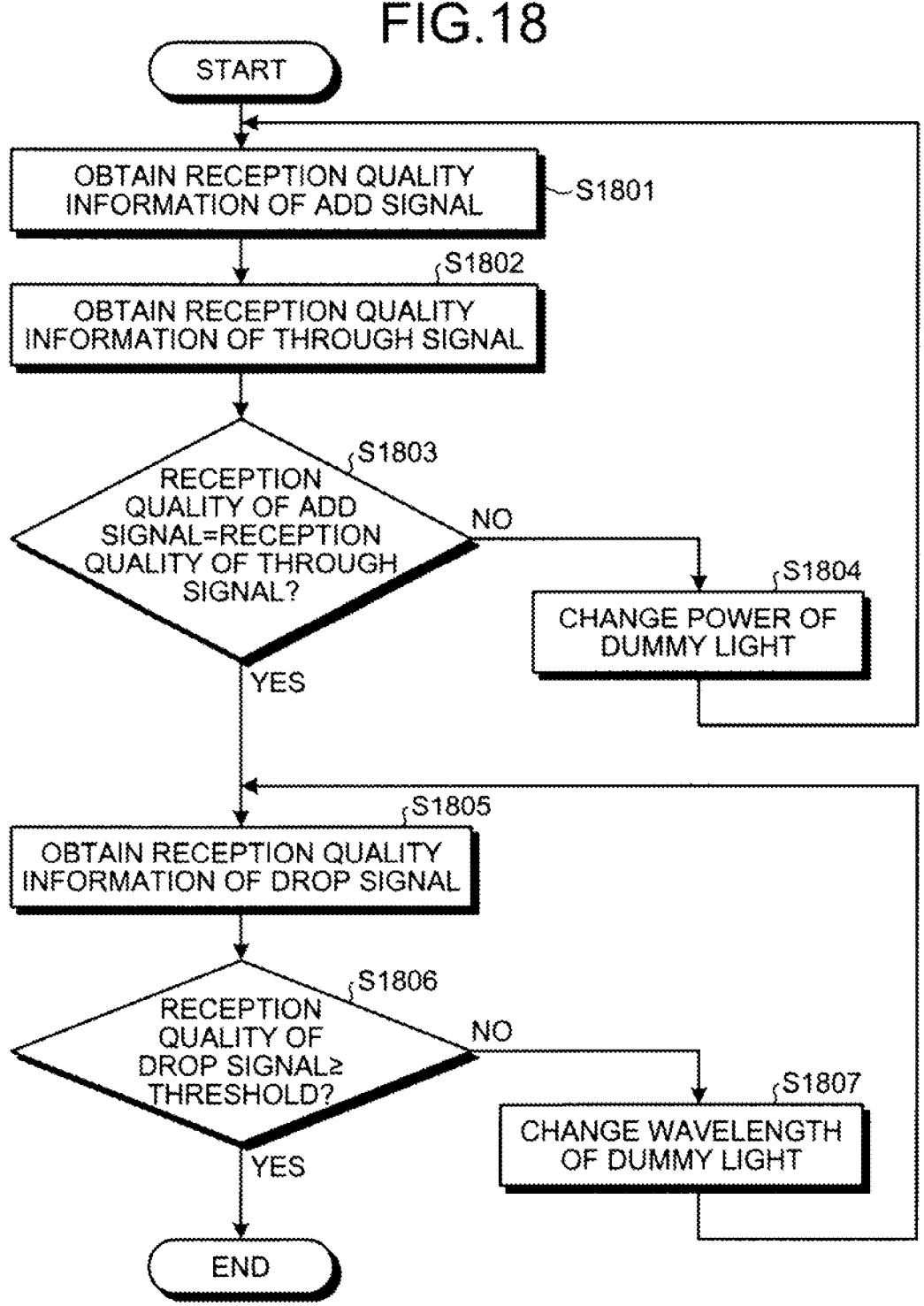
FIG. 18 is a flowchart of an example of a control of the power of the dummy light.

FIG. 18 is a flowchart of an example of a control of the power of the dummy light. An example is described where the controller 113 of the SLTE 271 controls the power of dummy light of the upstream branch line and the downstream branch line that are connected to the upstream trunk line. In this case, the controller 113 executes each operation depicted in FIG. 18.

The controller 113 obtains reception quality information indicating the reception quality at the landing station 250 of an add signal to the upstream trunk line transmitted from the SLTE 271 (operation S1801). The controller 113 obtains reception quality information indicating the reception quality at the landing station 250 of a through signal transmitted from the landing station 210 on the upstream trunk line (operation S1802). A method of obtaining the reception quality information at operations S1801 and S1802 is described later.

The controller 113 determines whether the reception quality of the add signal and that of the through signal indicated by the reception quality information obtained at operations S1801 and S1802 are the same (or substantially the same) (operation S1803). If not (operation S1803: NO), the controller 113 changes the power of the dummy light included in the WDM light transmitted by the transmitter 111 (operation S1804), and returns to operation S1801.

For example, the controller 113 decides the direction in which the difference of the reception quality between the add signal and the through signal becomes smaller, and changes the power of the dummy light in the direction by a given amount. By operations S1801 to S1804, the power of the dummy light combined to the add signal can be controlled such that the reception quality of the add signal becomes the same as that of the through signal. Alternatively, the power of the dummy light combined to the add signal may be controlled such that the reception quality of the add signal greater than or equal to a threshold. In this case, operation S1802 may be omitted.

If the reception quality of the add signal and that of the through signal are the same (operation S1803: YES), the controller 113 proceeds to operation S1505 and obtains reception quality information indicating the reception quality at the SLTE 271 of a drop signal transmitted from the landing station 210 and dropped by the OADM circuit 231 (operation S1805). A method of obtaining the reception quality information is described later.

The controller 113 determines whether the reception quality of the drop signal indicated by the reception quality information obtained at operation S1805 is at least equal to a threshold (operation S1806). If not (operation S1806: NO), the controller 113 changes the wavelength of the dummy light included in the WDM light transmitted by the transmitter 111 (operation S1807), and returns to operation S1805.

For example, the controller 113 decides the direction in which the reception quality of the drop signal improves, and changes the wavelength of the dummy light in the direction by a given amount. By operations S1805 to S1807, the power of the dummy light combined to the through signal can be controlled such that the reception quality of the through signal exceeds the threshold.

If the reception quality of the drop signal indicated by the reception quality information exceeds the threshold (operation S1806: YES), the controller 113 ends the sequence of operations. For example, an error rate can be used as the reception quality information obtained at operations S1801, S1802, and S1805.

A method of obtaining the reception quality information by the controller 113 at operations S1801 and S1802 is described next. For example, the SLTE 251 measures, among the signal light received by the receiver 252, the reception quality of the signal light that is transmitted from the SLTE 271 and added by the OADM circuit 231, and transmits the measured reception quality information to the SLTE 271. Thus, the controller 113 can obtain the reception quality information indicating the reception quality of the add signal transmitted from the SLTE 271 to the upstream trunk line.

The SLTE 251 also measures, among the signal light received by the receiver 252, the reception quality of the signal light that is transmitted from the SLTE 211 and passed through by the OADM circuit 231, and transmits the measured reception quality information to the SLTE 271. Thus, the controller 113 can obtain the reception quality information indicating the reception quality at the SLTE 251 of the through signal transmitted from the landing station 210 on the upstream trunk line.

For example, a drop path to the landing station 270 from the downstream trunk line can be used as a path for transmitting the reception quality information from the SLTE 251 to the SLTE 271. However, the path for transmitting the reception quality information is not limited to this, and another path can be used.

A method of obtaining the reception quality information by the controller 113 at operation S1805 is described next. For example, the SLTE 271 includes a measuring unit that measures, among the signal light received by the receiver 112, the reception quality of the signal light that is transmitted from the SLTE 211 and dropped by the OADM circuit 231. The measuring unit outputs the measured reception quality information to the controller 113. Thus, the controller 113 can obtain the reception quality information indicating the reception quality at the SLTE 271 of the drop signal that is transmitted from the SLTE 211 and dropped by the OADM circuit 231.

As described above, the controller 113 obtains the reception quality information indicating the reception quality of the add signal (first signal light) transmitted from the SLTE 271, and controls the power of the dummy light based on the obtained reception quality information. Thus, the power of the dummy light can be controlled such that the reception quality of the add signal satisfies a given condition. Thus, the communication quality on the upstream branch line can be improved.

Alternatively, the controller 113 may obtain the number of wavelengths of the signal light included in the add signal, and control the power of the dummy light according to the obtained number of wavelengths. For example, the controller 113 reduces the power of the dummy light as the number of wavelengths increases.

The controller 113 also obtains the reception quality information indicating the reception quality of the drop signal (second signal light) from the OADM circuit 231, and controls the transmittance of the dummy light based on the obtained reception quality information. Thus, the transmittance of the dummy light can be controlled such that the reception quality of the drop signal satisfies a given condition. Thus, the communication quality on the downstream branch line can be improved.

Alternatively, the controller 113 may obtain the number of wavelengths of the signal light included in the drop signal, and control the transmittance of the dummy light according to the obtained number of wavelengths. For example, the controller 113 reduces the transmittance of the dummy light as the number of wavelengths increases.

Figure 19:
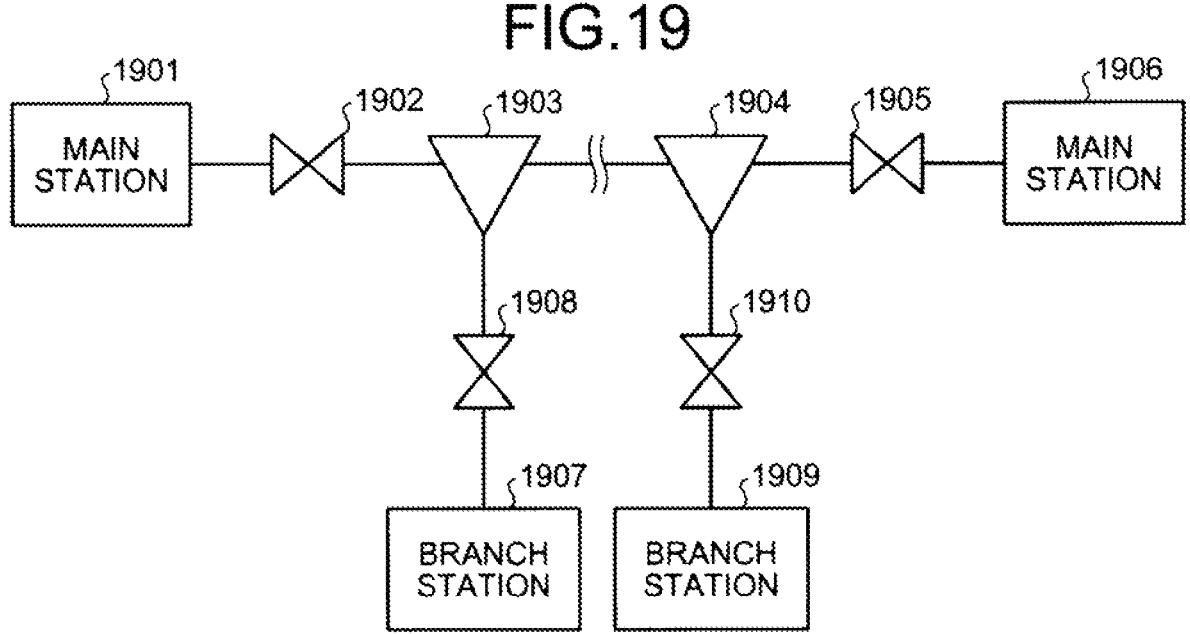
FIG. 19 is a diagram of another example of an application of the communication system depicted in FIG. 1.

FIG. 19 is a diagram of another example of an application of the communication system depicted in FIG. 1. A submarine communications system 1900 depicted in FIG. 19 includes main stations 1901 and 1906, submarine repeaters 1902, 1905, 1908, and 1910, submarine branching units 1903 and 1904, and branch stations 1907 and 1909.

The communication system 100 depicted in FIG. 1 can be applied to, for example, the portion formed by the submarine branching unit 1903, the branch station 1907, and the submarine repeater 1908. The communication system 100 can be also applied to, for example, the portion formed by the submarine branching unit 1904, the branch station 1909, and the submarine repeater 1910.

As described above, the communication system 100 can be applied to each branch line of the submarine communications system 1900. However, the communication system 100 can be applied to not only each branch line of the submarine communications system 200/1900, but also a communication system having a bidirectional line. For example, the first communication device 110 depicted in FIG. 1 may be applied to the landing station 210 of the submarine communications system 200, and the second communication device 130 depicted in FIG. 1 may be applied to the submarine branching unit 230 or the landing station 250 of the submarine communications system 200.

As described above, the communication system, the communication device, and the communication method can improve the communication quality.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
   a transmitter that combines and transmits a first signal light and a dummy light having a wavelength different from the first signal light;
   a first amplifier that amplifies a light transmitted by the transmitter to a constant power;
   a communication device that separates the dummy light from the light amplified by the first amplifier, has a variable transmittance and allows the separated dummy light to pass through, and combines and transmits the passed dummy light and a second signal light having a wavelength different from the dummy light;
   a second amplifier that amplifies a light transmitted by the communication device to a constant power;
   a receiver that receives the second signal light included in the light amplified by the second amplifier; and
   a controller that controls the transmittance.

2. The communication system according to claim 1, wherein the controller controls the power of the first signal light combined by the transmitter.

3. The communication system according to claim 2, wherein the controller obtains reception quality information indicating the reception quality of the first signal light, and controls the power of the dummy light based on the obtained reception quality information.

4. The communication system according to claim 1, wherein
   the communication device includes an optical filter that allows the separated dummy light to pass through and of which transmittance differs according to wavelength of light, and
   the controller controls the wavelength of the dummy light combined by the transmitter.

5. The communication system according to claim 4, wherein the optical filter has characteristics where the transmittance with respect to wavelength periodically changes in a wavelength band of the dummy light.

6. The communication system according to claim 4, wherein
   the optical filter is a variable optical filter of which transmittance characteristics with respect to the wavelength of a light that passes therethrough is variable, and
   the controller controls the characteristics of the variable optical filter.

7. The communication system according to claim 1, wherein
   the communication device includes an optical variable attenuator that allows the separated dummy light to pass through and of which attenuation amount is variable, and
   the controller controls the attenuation amount of the optical variable attenuator.

8. The communication system according to claim 1, wherein the communication device is an add/drop device that includes an inserting unit that inserts the first signal light included in the light amplified by the first amplifier into another optical line, and a branching unit that branches the second signal light from the optical line, and combines the second signal light branched by the branching unit and the dummy light.

9. The communication system according to claim 1, wherein the transmitter and the receiver are provided in a single communication device.

10. The communication system according to claim 1, wherein the communication device is a communication device provided on the bottom of sea.

11. The communication system according to claim 1, wherein the controller obtains reception quality information indicating the reception quality of the second signal light, and controls the transmittance based on the obtained reception quality information.

12. A communication device that transmits/receives a light to/from other communication device, wherein the other communication device
   separates a dummy light from a transmitted light in which a first signal light and the dummy light having a wavelength different from the first signal light are combined,
   has a variable transmittance and allows the separated dummy light to pass through, and
   combines and transmits the passed dummy light and a second signal light having a wavelength different from the dummy light, the communication device comprising:
   a transmitter that combines the first signal light and the dummy light and transmits the combined light to the other communication device via a first amplifier that amplifies light to a constant power;
   a receiver that receives the second signal light included in a light transmitted by the other communication device via a second amplifier that amplifies light to a constant power; and
   a controller that controls the transmittance.

13. A communication device that transmits/receives a light to/from another communication device that includes a transmitter that transmits a light in which a first signal light and a dummy light having a wavelength different from the first signal light are combined, the communication device comprising:
   a separator that separates the dummy light from a light transmitted by the other communication device via a first amplifier that amplifies light to a constant power;
   a transmission unit that has a variable transmittance and allows the dummy light separated by the separator to pass through; and
   a combiner that combines the dummy light that has passed through the transmission unit and a second signal light having a wavelength different from the dummy light, wherein
   the communication device transmits the light combined by the combiner to the other communication device via a second amplifier that amplifies light to a constant power.

14. A communication method comprising:
   transmitting a light in which a first signal light and a dummy light having a wavelength different from the first signal light are combined via a first amplifier that amplifies light to a constant power;
   separating the dummy light from the light transmitted via the first amplifier;
   allowing the separated dummy light to pass through according to a variable transmittance;
   combining the passed dummy light and a second signal light having a wavelength different from the dummy light;
   transmitting the combined light via a second amplifier that amplifies light to a constant power;
   receiving the second signal light included in the light transmitted via the second amplifier; and
   controlling the transmittance.

* * * * *